United States Patent
Bolder et al.

(10) Patent No.: US 7,710,999 B2
(45) Date of Patent: May 4, 2010

(54) POLICY CALENDAR

(75) Inventors: Ronald Scott Bolder, Ottawa (CA); Sasa Nijemcevic, Nepean (CA); David Kiesekamp, Merrickville (CA); Bich-Le Truong, Nepean (CA)

(73) Assignee: Alcatel Lucent, Paris (FR)

( * ) Notice: Subject to any disclaimer, the term of this patent is extended or adjusted under 35 U.S.C. 154(b) by 768 days.

(21) Appl. No.: 11/411,968

(22) Filed: Apr. 27, 2006

(65) Prior Publication Data

US 2007/0255842 A1 Nov. 1, 2007

(51) Int. Cl.
*H04J 3/16* (2006.01)

(52) U.S. Cl. .................. 370/465; 709/230; 715/736

(58) Field of Classification Search .......... 709/224, 709/230; 370/465
See application file for complete search history.

(56) References Cited

U.S. PATENT DOCUMENTS

| | | | | |
|---|---|---|---|---|
| 4,937,743 | A * | 6/1990 | Rassman et al. | 705/8 |
| 5,247,438 | A * | 9/1993 | Subas et al. | 700/90 |
| 5,659,768 | A * | 8/1997 | Forbes et al. | 715/201 |
| 5,842,173 | A * | 11/1998 | Strum et al. | 705/1 |
| 6,453,371 | B1 * | 9/2002 | Hampson et al. | 710/37 |
| 6,539,026 | B1 * | 3/2003 | Waclawsky | 370/428 |
| 6,751,659 | B1 * | 6/2004 | Fenger et al. | 709/223 |
| 6,801,820 | B1 * | 10/2004 | Lilly et al. | 700/100 |
| 7,092,943 | B2 * | 8/2006 | Roese et al. | 707/9 |
| 7,111,053 | B1 * | 9/2006 | Black et al. | 709/220 |
| RE40,187 | E * | 3/2008 | Abraham et al. | 709/224 |
| 7,346,705 | B2 * | 3/2008 | Hullot et al. | 709/238 |
| 7,380,267 | B2 * | 5/2008 | Arai et al. | 726/1 |
| 7,430,198 | B2 * | 9/2008 | Mower et al. | 370/349 |
| 2002/0122422 | A1 | 9/2002 | Kenney et al. | |
| 2003/0041139 | A1 | 2/2003 | Beadles et al. | |
| 2004/0039803 | A1 | 2/2004 | Law | |
| 2004/0221051 | A1 * | 11/2004 | Liong et al. | 709/230 |
| 2007/0153803 | A1 * | 7/2007 | Lakshmanamurthy et al. | 370/395.43 |

\* cited by examiner

*Primary Examiner*—Derrick W Ferris
*Assistant Examiner*—Mang Yeung
(74) *Attorney, Agent, or Firm*—Kramer & Amado, P.C.

(57) ABSTRACT

A calendar tool displays policies that are scheduled to function in managed networks. The tool allows the network administrator to select and view individual scheduled policies, many individual scheduled policies or scheduled policy suites. The calendar identifies the different scheduled policies as rectilinear colored blocks of time on a calendar. These blocks will open their properties forms when double selected. Overlaps of scheduled policies and gaps between scheduled policies can be identified visually on the calendar because they are displayed in two distinct blocks of color which are different from any other colored block displayed. The administrator/user can see all policies that contribute to an overlap by simply selecting on the particular overlap. The user can see calendar information either in a weekly or daily format.

15 Claims, 3 Drawing Sheets

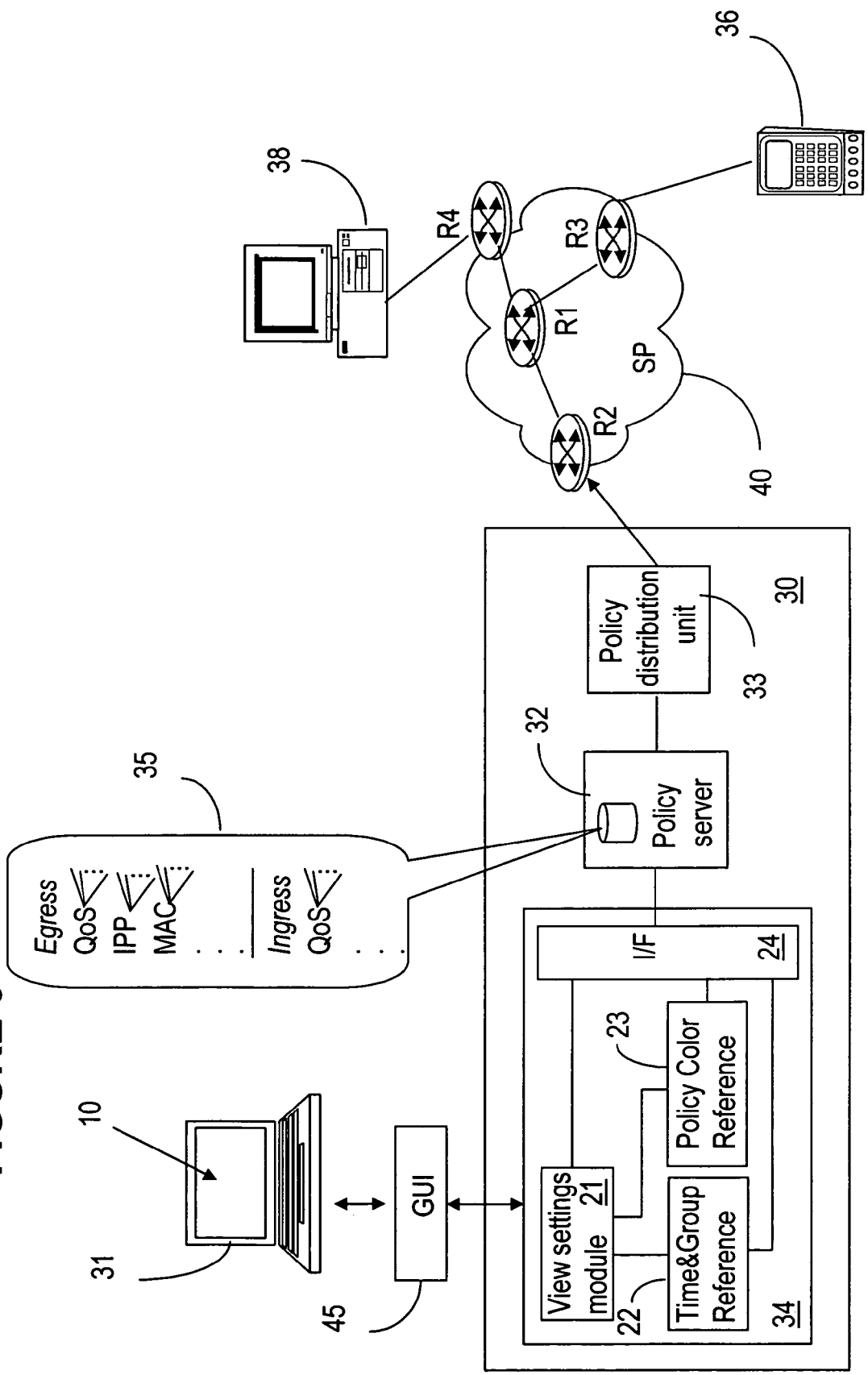

POLICY CALENDAR

FIELD OF THE INVENTION

The invention is directed to communication networks and in particular to a policy calendar for enabling scheduling of policies over time.

BACKGROUND OF THE INVENTION

A network service is dependent on the amount of data it can send and receive from a source device to one or more destination devices. As such a network service is dependent on the resources it can utilize to transfer the data and on various parameters of these resources, such as uptime, outages, bandwidth, delay, loss, and jitter. For example, an e-mail service requires far less network resources than a video conferencing service because the e-mail service often has relatively little data to send and it is generally acceptable if an e-mail transmission is slightly delayed in transiting a network. On the other hand, a typical video conference requires enough network resources to send data constantly and seamlessly in two directions. If the network resources are simply shared between these two (and may be other) network services, the e-mail service will deliver e-mail extremely fast, but the video conferencing service would not be able to display a very clear picture.

A set of rules for allocating network resources between the various network services is called a "policy". Policies are used for allocating network resources to services in a fair way, such that in the above example the video conferencing service receives more network resources than the e-mail services. In broad terms, policies distribute the network resources to services based on the type of service (e-mail, video, etc) and other factors, some determined through agreed upon attributes for network connections, often established as SLAs (service level agreements).

Today's network management applications are run and configured through policies that can be scheduled to operate over time. From time to time, it is necessary to change one or more policies. Since many policies can be used at the same time by different subscribers, or over a period of time, it is difficult for a network administrator/user to have an easy way to see what policy is being used at a specific time or a range of times. In addition, since the number of subscribers to a service is very large and continues to grow, network administrators/users have problems identifying policies that operate simultaneously and/or gaps of time where policies are operating. Both these situations will result in network problems if not corrected.

US Patent application 20040039803 (Law) entitled "Unified Policy-based Management System" describes a system for enforcing QoS defined by policy rules at a network node. The network management system employs a Policy Enforcement Agent (PEA) responsible for capturing a policy rule in flight and translating the policy rule to an actual policy enforcement action executable at a network node. The patent application mentions use of a GUI (graphical user interface) to schedule Policy Enforcement Agents (PEAs).

However, this US Patent Application does not provide any details of such how a GUI may be used for policy scheduling.

US Patent application 20030041139 (Beadles et al.) entitled "Event Management for A Remote Network Policy Management System" describes an event manager that provides dynamic response for the purposes of controlling policy updates, generation and deployment. Dynamic events are used to communicate the fact that policy changes/updates/creations have occurred.

However, this US Patent Application does not describe a GUI used for policy management. In fact, this reference describes placing a policy application under the control of an event management system that applies policies in response to the occurrence of events in the system. That is, policies are not applied according to a schedule, but rather they are applied dynamically in response to network events.

US Patent application 20020122422 (Kenney et al.) entitled "Central Policy Manager" describes a classification hierarchy used for characterizing network traffic at a high level both to allow measurements of network traffic and to describe a policy for each network QoS. An XML (extensible mark-up language) API (application programming interface) allows applications to manage a central repository of policies. Policies templates allow network QoS policies to be re-used across multiple links. Policy alarms can be raised by quality-of-service devices when a policy is violated. The policy manager describes associating a policy with a schedule, in tabular format, which sets the time when the policy should be enforced.

However, this US Patent Application does not address the problem of detecting and resolving policy scheduling problems such as policy application overlaps, referred to as "conflicts" and absences in policy application, referred to as "gaps".

SUMMARY OF THE INVENTION

It is an object of the invention to provide a policy calendar for enabling policies to operate over time without conflict or gaps.

The invention is applicable to scheduling policies in networks equipped with a Service Aware Manager (SAM). However, it is to be noted that applicability of the invention is not restricted to SAM managed networks, but can be used in any managed networks using policy based configuration and control. Scheduled policies are becoming more and more common in all forms of network management products (element management, traffic engineering products, service assurance products, network testing products etc.). The policy calendar of the invention enables a policy administrator to view all policies active in a network domain, managed by a certain service provider. The term network domain is used here for a range of a network (network elements and the respective software applications) under the same administrative control.

The tool allows the network administrator to select and view individual scheduled policies, many individual scheduled policies or scheduled collections of policies (i.e. policy suites). The calendar identifies the different scheduled policies as rectilinear colored blocks of time on a calendar. These blocks open their properties forms when double selected. Overlaps of scheduled policies and gaps between scheduled policies can be identified visually on the calendar because they are displayed in distinct blocks of color which are different from any other colored block displayed (for non-overlapping policies). The administrator/user can identify all policies that contribute to an overlap by simply selecting on the particular overlap. The user can see calendar information either in a weekly or daily format.

Accordingly, the invention provides a method of managing policies established for traffic flows in a network domain for enabling a service provider to selectively enforce policies throughout the network domain, comprising: a) defining a plurality of policies type groups identifiable by a policy template, each group defining a plurality of policies characterized by a specified range of values for traffic attributes applicable to traffic flow; b) configuring a calendar view on a GUI screen, the calendar showing policies scheduling for a selected port, wherein each policy is shown as a block of a distinctive color extending over a period of time, in a column identified by the policy template; c) maintaining the policies groups and policies in each group on a policy server, associated with timing information regarding enforceability of the policies for the traffic flow; and d) distributing the policies from the server to all network elements in the network domain that are involved in receiving and transmitting the traffic flow.

The invention also provides a policy calendar system for managing policies established for traffic flows in a network domain for enabling a service provider to selectively enforce policies throughout the network domain, comprising: a policy server for maintaining a record of all policies currently applicable to a traffic flow established across the network domain; a policy GUI module for configuring a policy calendar on a terminal, based on the record maintained by the policy server; and a policy distribution unit for updating the network elements in the network domain that are involved in receiving and transmitting the traffic flow with any changes in policies on the policy server.

Advantageously, the invention enables a policy administrator/user quick visual access to see what policies are scheduled and when, and to see in specific instances when they overlap (conflict) or are missing (time gaps).

Another advantage of the invention is that a policy administrator/user may correct any conflict and fill the gaps as necessary, based on the information presented by the policy calendar. This is particularly relevant for ensuring that traffic is treated fair for all subscribers with a view to enforce the respective SLAs.

Still another advantage of using a policies calendar is that it gives the user a fast way to access the properties/configuration forms for each policy. The policy calendar may also be advantageously used in the commissioning process of a network to build sets of policies that could then be deployed to objects in the network.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3 shows operation of the policy calendar tool according to an embodiment of the invention.

DETAILED DESCRIPTION

Figure 1:
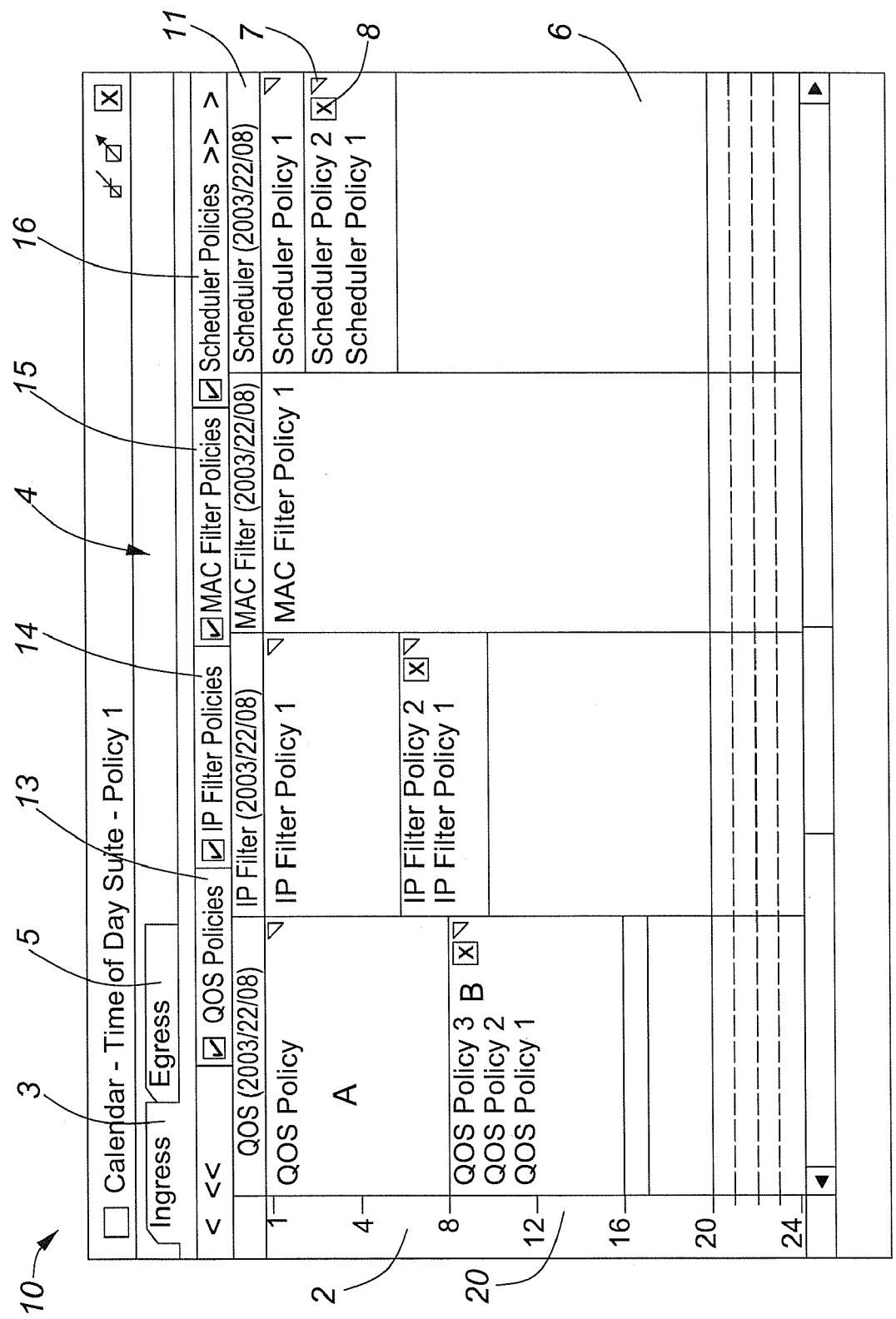
FIG. 1 illustrates an example of a policy calendar screen (day calendar) according to the invention.

FIG. 1 illustrates an example of a day calendar screen 10 provided by the policy calendar tool according to the invention. The calendar functionality may be selected on "List" and "Configuration" windows that are modified to include a Policy Calendar button. Preferably, the policy calendar is presented to the user in the form of a table with rows indicating the time-of-day, as shown by a time-of-day field 2, columns specifying the policy type group, as shown by a policies specification field 4. The policies are shown in policy fields 6, which show the actual policy for each block of time. In this way the user can readily see for how long a policy extends during the day. We note that the column and row identification may be switched to show the time-of-day as column headers, and the policies groups as row headers; FIG. 1 presents a preferred embodiment.

The time-of-day field 2 provides the time in hours and half hours intervals increasing from top to bottom; a marker 20 indicates the current time. It is to be understood that the time scale may provide different (larger or smaller) divisions of the time, as desired.

The policies specification field 4 has various buttons and selection fields, shown in this embodiment at the top of screen 10. In a top-most row, "ingress" button 3 and "egress" button 5 enable the user to see the policy calendar for a selected ingress and respectively egress port (by selecting "Ports" under Network Objects). The example shown in FIG. 1 illustrates the policies for an ingress port, as shown by the depressed state of button 3. Next row on the policy specification field 4 is provided for enabling selection of the policies type/s to be shown on the calendar screen. In the example of FIG. 1, the administrator/user may select to view or not the QoS policies 13, the IP filter policies 14, the MAC filter policies 15 and the Scheduler policies 16. If desired, calendar view 10 can be easily modified to show only some of the policies selectors, using the check mark fields.

Each of policies type selectors 13, 14, 15 and 16 subtends a selection of policies, each being defined by a specific grouping of rules. As indicated above, the rules enforce the agreed-upon attributes and/or attribute ranges on the respective traffic; they may include customer-specific policies (based on agreements between the service provider and the respective users), service-specific policies (IP, TCP, VoIP, video, etc) and resource-specific policies (e.g. allocated bandwidth, mean rate, peak rate, burst rate, jitter, transit delay, latency, priority, security level, etc.). Such a grouping (selection) of policies under a respective policies type selector 13, 14, 15 and 16 is referred to here as "a policies set". The policy set is specific for the traffic in the category/class defined by the selectors 13, 14, 15 and 16.

For example, the QoS policies are applicable to ATM and IP network domains, IP filter policies are applicable to IP network domains, MAC filter policies are applicable to LANs, etc, scheduler policies are applicable to ATM network domains. The attributes under the QoS (quality of service) selector 13 identify the traffic that should receive prioritized service, including parameters such as guaranteed lower bonds on data rates, delay jitter and loss. It is also to be noted that other policies types may be defined, in which case additional selectors may be provided on the policy specification field.

The next row 11 in the policy specification field provides the policies type template for the policies shown in the respective column. Preferably, the current date is also shown next to the policies type for user's convenience. Preferably, for easy identification, all policies shown under a template use the same color, as seen by the tones of grey in FIG. 1, which differ from column to column.

Policy fields 6 identify a specific policy that is enforced for the traffic over a certain period of time. In the example of FIG. 1, the identification is spelled in each field; other arrangements may be however used, such as different colors for each policy, etc. In this example, the calendar tool screen 10 shows three policy types under the QoS template, namely Policy1, Policy2, Policy 3. As an example, Policy1 may require a delay of 0.05 seconds, a jitter of 0.01 seconds and a loss between $e^{-6}$ $e^{-8}$. Preferably, the policy type may be designated with Platinum, Gold, Bronze, and variants such as Gold Plus, etc. In general, a policy is associated to a certain account policy, which may be different form subscriber to subscriber. It is to be noted that the policy calendar screen 10 may be designed to show as many policies 6 as may be handled by the service provider and is not limited to the three types of services shown in FIG. 1 by way of example.

The tool also allows the network administrator to select a policy block 6, view the particular policies applicable for the respective block and edit the policies, if need be. Selection of a policy 6 may for example be performed by double clicking on tab 7 or by double clicking anywhere within the block 6. The user may then view individual scheduled policies, many individual scheduled policies or scheduled policy suites (which are collections of policies).

Overlaps of scheduled policies 6, and gaps between scheduled policies can be identified visually on the calendar because they are displayed in distinct colors (seen in a darker grey on FIG. 1), which are different from any other colored block displayed. In addition, the overlap is identified with a special mark, as shown at 8. The administrator/user can see all policies that contribute to an overlap by single-clicking on tab 7 provided on the overlap area. This allows the user to move between different overlapping conflicting Policies; they can double click on a Policy of interest to display the respective attributes.

For example, the ingress traffic under the QoS template has attributes that confer it a Policy1 status between 1:00 am and 20:00 pm, as shown by the block denoted with A. However, there is an overlap between 8:00 pm and 16:00 pm with policies Policy2 and Policy3 as shown by area denoted with B; the overlap appears in a different color (here dark grey). In order to address the problem, the user can select tab 8 associated with the respective overlapping blocks to correct the problem.

Under the same QoS template, there is a gap between 20:00 pm and 24:00 pm, meaning that no policy is imposed on the traffic during this period, which is not acceptable. Again, the policy administrator will correct this gap by associating the duration of the gap with a certain QoS policy. A new policy, or calendar updates/changes are created using a policy configuration tool; the calendar screen is refreshed after any change in order to see the update.

Figure 2:
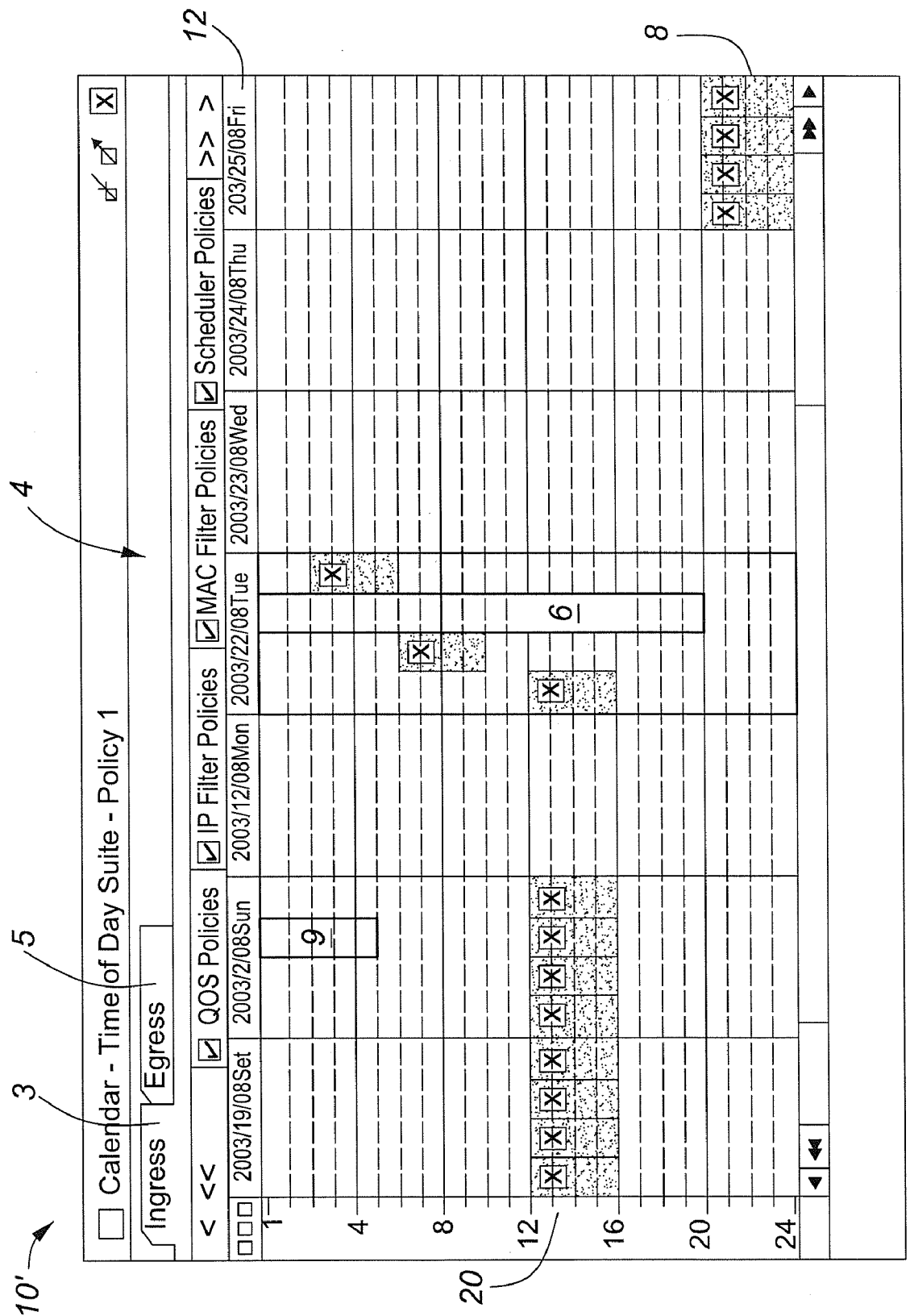
FIG. 2 illustrates another example of a policy calendar screen (week calendar) according to the invention.

FIG. 2 shows an example of a policy calendar screen 10' that shows policies scheduling for a week. This view is better used for identifying the overlaps and gaps that extend over more than a day. As shown in FIG. 2, in this case the third row in the policies specification field 4 indicated the day of the week, and is used for selecting the day view screen 10 of FIG. 1, for details.

FIG. 3 shows a block diagram of an embodiment of the policy calendar of the invention. FIG. 3 illustrates customers 36 and 38 connected over a network domain 40, managed by a service provider SP. Customers 36 and 38 exchange traffic, which is governed by policies agreed upon with the service provider. Customers 36 and 38 are illustrated as a hand-held device 36 and a computer 38 for simplification; it is obvious that the customers 36 and 38 may represent a network (e.g. a LAN, or a wireless LAN) that connects a plurality of individual computers, all getting the same level of service. Network 40 includes routers R1-R4; it is to be noted that service provider network 40 may have any other configuration. For example, network 40 may also include an ATM domain, or a hybrid ATM-IP, or ATM-MPLS domain, etc.

The services provider uses a policy calendar system 30 and a terminal 31 that enables display of screens 10, 10' as shown in FIGS. 1 and 2. Policy calendar system 30, which may be provided as an independent tool, or may be integral part of a network management system, includes a policy server 32 and a policy GUI module 34.

While server 32 is shown generically to include a database for storing the policies; it is to be noted that server 32 also includes modules that enable write/read operations to/from database, and other operations for enabling maintenance of this information. Policy server 32 controls the objects within domain 40 in accordance with the policies applicable to the ingress and egress traffic for each port on network devices R1-R4, as shown in the insert. System 30 also comprises a policy distribution module 33 that updates the routers with any changes in policies on the policy server.

Policy GUI module 34 enables the policy administrator to organize and display the information on administrator's terminal 31 as discussed above in connection with FIGS. 1 and 2. Policy GUI module 34 is shown on FIG. 3 as distinct from the network management GUI 45, but evidently it may be integrated in the existing GUI. Policy GUI module 34 includes a view setting module 21 that enable the user to select the policies type groups the user wishes to see, and the time of interest (week, day). A time and group reference unit 22 provides the time scale and configures screen 10 according to the view type (day, week) and the selected policies type groups 13-16. A policy reference color unit 23 associates the policies type group and the policies in the group with a specific color. Interface 24 enables GUI 45 to configure/update the policies on server 32 and also enables policy GUI module 34 to access server 32 for extracting information from server 32.

The main operations performed by server 30 are writing, viewing and correcting/updating policies. Writing new policies operation is performed when a new customer/subscriber requests a service available across the service provider network, or a customer requests a new service. The administrator will then provide the pertinent information to the policy server 32, as agreed upon with the customer. Next, the information is distributed to all routers that carry the traffic affected by the respective policies, for enforcing the respective policies at each router along the path.

Viewing the policies operation was described above in connection with FIGS. 1 and 2. Namely, the administrator select the ingress or egress port of interest on a certain router, selects the type of window it wishes to view (day, or week view, etc), policy template fields 4, by customizing screen 10 as needed.

Updating and/or correcting policies operation is performed based on the information displayed on screen 10. Now, the administrator has the possibility to correct any overlaps and gaps; the corrected information is then stored on policy server 32 distributed to routers R1-R4 for enforcing the respective policies.

We claim:

1. A method of managing policies established for traffic flows in a network domain for enabling a service provider to selectively enforce policies for ports throughout the network domain, comprising:

defining a plurality of policies type groups, including identifying each group by a policy template name from among a plurality of given policy template names, each policies type group defining a plurality of policies, each of said policies having a specified range of values for a particular type of traffic attributes associated with the policies type group and applicable to traffic flow;

receiving a selection instruction selecting one of the ports;

configuring a calendar view on a GUI screen, corresponding to the selected port, said calendar showing a policies scheduling for the given selected port, wherein said calendar view includes a plurality of columns, each column indicating one of the policy template names and showing, as one or more blocks of a distinctive color, each block extending over a portion of the column to represent a scheduled period of time for which at least one of the policies of the policies type groups identified by the policy template name is enforced for the selected port;

maintaining a policies record of said policies groups and policies in each policies group on a policy server, with an associated timing information for each of the ports, the timing information corresponding to the policies and schedules of said policies represented by said distinctively colored blocks of said columns of the GUI screen for each of the ports; and distributing said policies from said server to network elements in said network domain that are involved in receiving and transmitting traffic flow on the ports having a corresponding configured GUI screen.

2. A method as claimed in claim 1, further comprising:
detecting a change in the policies record; and
in response to detecting said change, redistributing said policies from said server to all network elements in said network domain that are involved in receiving and transmitting said traffic flow on the ports having a corresponding configured GUI screen.

3. A method as claimed in claim 1, wherein said plurality of policies type groups include at least a QoS policies group, an IP filter policies group, a MAC filter policies group and a scheduler policies group.

4. A method as claimed in claim 1, wherein said calendar view on said GUI screen comprises a table with rows specified by a time-of-day field identifying the day time interval that a certain policy is applicable to said traffic flow, and columns specified by a policies specification field, for identifying the policies type groups for said certain policy.

5. A method as claimed in claim 4, wherein said time-of-day field provides a time scale with the time in hours and hour intervals and an indication of the current time.

6. A method as claimed in claim 1, wherein said calendar view on said GUI screen comprises a table with rows specified by a time-of-day field identifying the day time interval that a certain policy is applicable to said traffic flow on the port corresponding to the configured GUI screen, columns specifying the day of the week and sub-columns specified by a policies specification field, for identifying the policies type groups for said certain policy.

7. A method as claimed in claim 4, wherein said policies specification field has ingress and egress port selection buttons.

8. A method as claimed in claim 4, wherein said policies specification field includes a plurality of policy selection fields for enabling selection of one or more of said plurality of policies type groups to be shown on the calendar view.

9. A method as claimed in claim 1, further comprising:
identifying a policy for a certain one of the ports, a certain time interval and certain policies type groups; and
selecting said policy, said selecting providing for clicking on the respective block for viewing the attributes of said policy.

10. A method as claimed in claim 9, further comprising selectively editing the attributes of said policy.

11. A method as claimed in claim 1, further comprising:
identifying a policy overlap as an overlap area on said calendar view defined by an overlap time and a policies template; and
editing the policies for said port and said policies type group for correcting said policy overlap.

12. A method as claimed in claim 1 further comprising:
identifying a policy gap as a gap area on said calendar view defined by a gap time and a policies template; and
entering a respective policy from the policies in said policies type group to extend over said gap time.

13. A policy calendar system for managing policies established for traffic flows in a network domain for enabling a service provider to selectively enforce policies for ports throughout the network domain, comprising:
a policy server for maintaining a current policies record of all policies currently applicable to a traffic flow established across said network domain;
a policy GUI module for configuring a policy calendar GUI on a terminal, based on said current policies record maintained by said policy server; and
a policy distribution unit for updating the network elements in said network domain that are involved in receiving and transmitting said traffic flow with any changes in said current policies on the policy server
wherein said policy server organizes said current policies record by grouping policies in policies groups based on the type of traffic in said traffic flow,
wherein said GUI includes a plurality of columns, each column indicating one of the policy template names and showing, as one or more blocks of a distinctive color, each block extending over a portion of the column to represent a scheduled period of time for which at least one of the policies of the policies type groups identified by the policy template name is enforced for the selected port.

14. A policy calendar as claimed in claim 13, wherein said policy GUI module comprises:
a view setting module for enabling selection of one or more policies type groups on said calendar view, and the time of interest (week, day); and
a policy color reference unit for associating each policies type group with a distinct color and for displaying the policies on said GUI according to their associated colors.

15. A policy calendar as claimed in claim 13, wherein said policy GUI module further comprises an interface to said policy server for enabling access, configuration and update of the policies record on said policy server.

* * * * *